July 2, 1968
W. N. JONES
3,390,574
TON-MILE MARKER
Filed Feb. 18, 1966
3 Sheets-Sheet 1
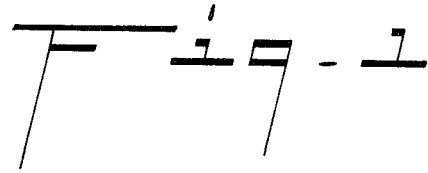
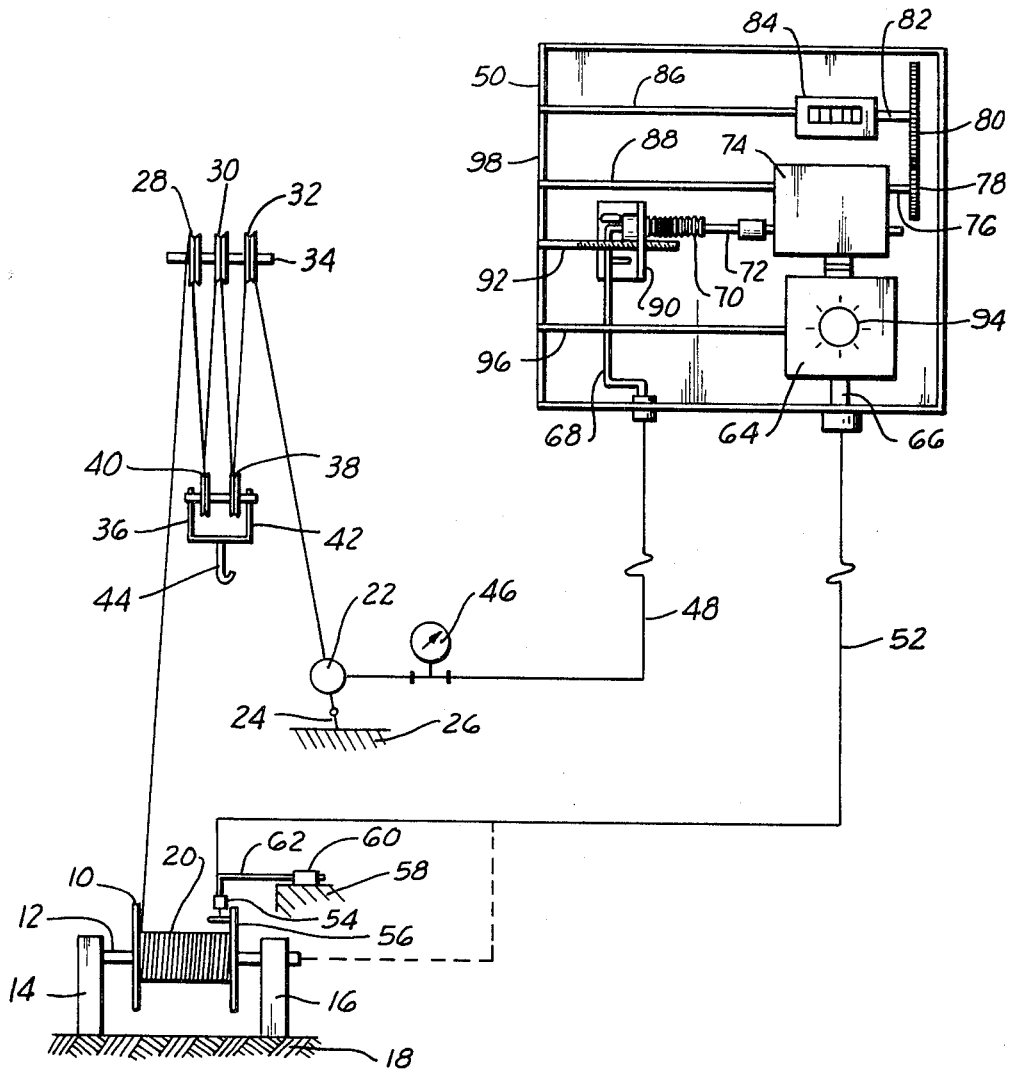
WILLIAM N. JONES
INVENTOR.
BY James A. Bargfrede
ATTORNEY

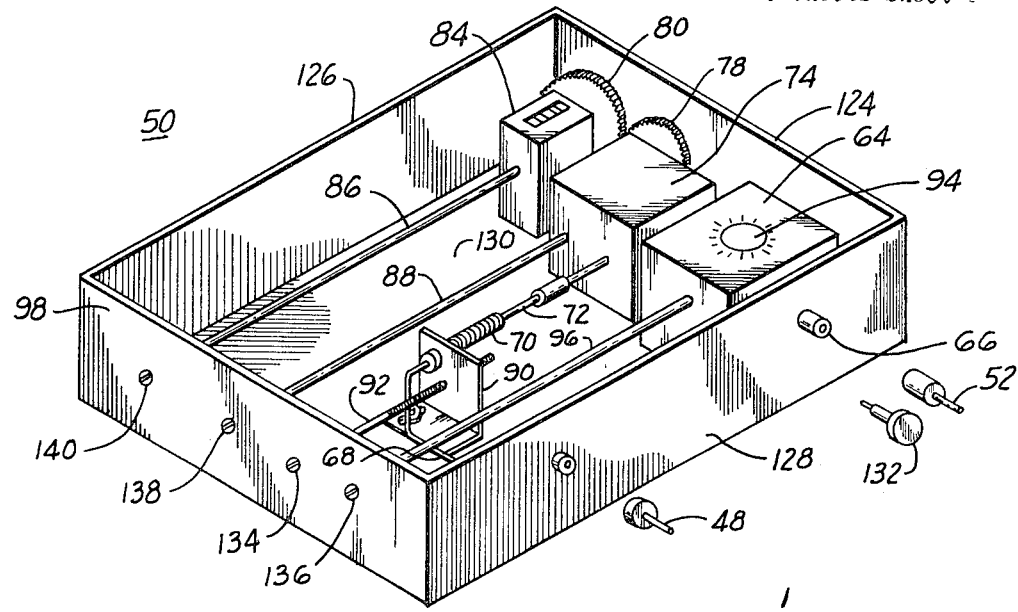
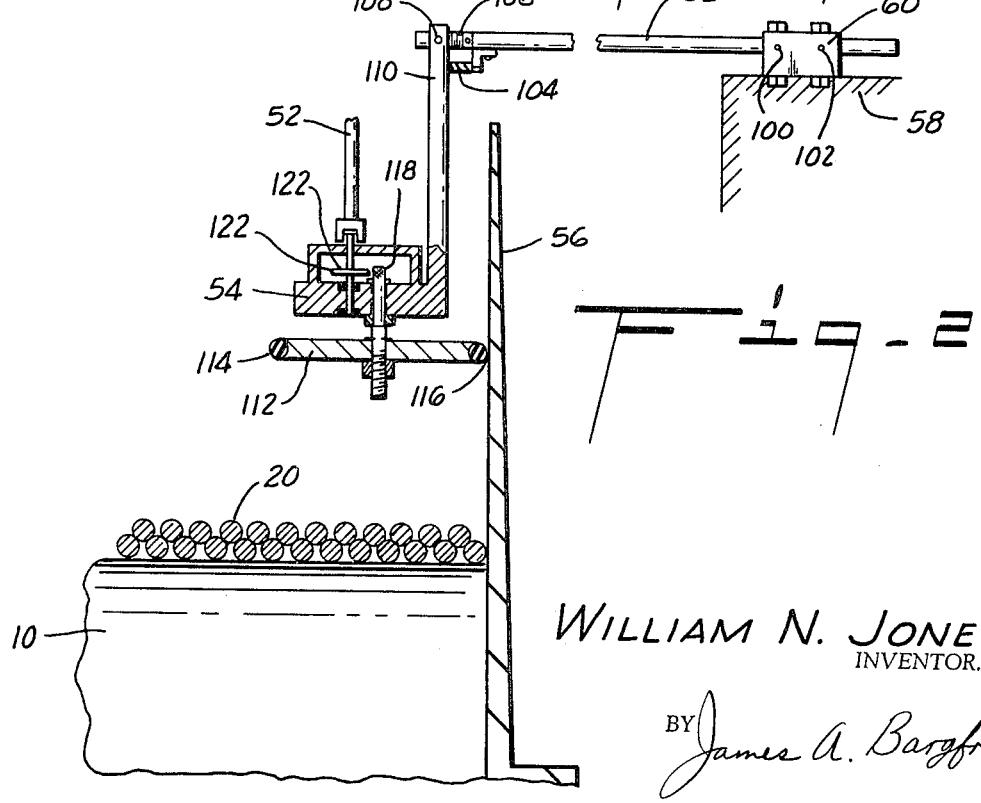
WILLIAM N. JONES
INVENTOR.
BY James A. Bargfrede
ATTORNEY United States Patent Office 3,390,574
Patented July 2, 1968

3,390,574
TON-MILE MARKER
William N. Jones, 7835 Santa Elena Drive,
Houston, Tex. 77017
Filed Feb. 18, 1966, Ser. No. 528,642
2 Claims. (Cl. 73—133)

ABSTRACT OF THE DISCLOSURE

Apparatus for continuously integrating and indicating on a digital counter the product of tensile load and distance traveled of any flexible line which operates a weighted apparatus such as a traveling block thereby providing an indication of ton-miles.

This invention pertains generally to measuring devices and particularly to a device which measures load on a flexible line times distance traveled by such flexible line.

Flexible lines such as wire ropes are used extensively in hoisting mechanisms and generally such flexible lines are wrapped on a powered cylindrical drum. To gain mechanical advantage for lifting heavy loads, a block and tackle system is employed with such flexible lines. As a result, the flexible line or wire rope which links the cylindrical drum and the several sheaves of the block system is subjected to many bending stresses as it is wound on and off the powered drum. The flexing of the wire rope under load causes fatigue which ultimately causes the wire rope to fail even though the allowable tensile load of the line has never been exceeded. Therefore, for safety reasons it has been desirable to either replace the entire flexible line or wire rope, or to slip additional new line into the working system at designated ton-mile accumulations prescribed by the wire rope manufacturer.

Prior to the present invention, only empirical methods have been used to estimate the accumulation of ton-miles on a wire rope and a need has existed for a simple, reliable, relatively inexpensive device for measuring the accumulation of ton-miles on a flexible line such as a wire rope.

Among some of the prior art disclosures which have dealt with the problem of fatigue on flexible lines are the following U.S. patents: 2,851,880—Fiedler, issued Sept. 16, 1958; 2,940,308—Calhoun, issued June 14, 1960; 2,984,103—Decker, issued May 16, 1961; 3,192,768—Hildebrandt, issued July 6, 1965; Re. 24,092—Decker, reissued Nov. 23, 1955.

Although the above-listed patents provide various means for measuring forces encountered in the drilling of wells particularly, and for measuring forces which may be encountered during drilling operations wherein a flexible line or wire rope is utilized, none of such patents disclose or suggest the device provided by the present invention.

Thus, an object of the present invention is to provide a device operated by suitable means such as mechanical means and hydraulic means wherein little or no power is required other than power derived from the system being measured.

Another object of the present invention is to provide a device for measuring the instantaneous product of line load and line translation. Thus, all accelerations of load are accurately measured to thus avoid use of conventional empirical estimates of accumulated ton-miles and use of only the static loads.

Another object of the present invention is to provide a device wherein the user of the device may evaluate flexible lines or wire ropes from different manufacturers and allow such user to select the most economical type and grade of flexible line.

Yet another object of the present invention is to provide flexible line manufacturers with an accurate measuring system for evaluating their own manufactured products to allow such manufacturers to improve their design of flexibe lines such as wire ropes.

Yet another object of the present invention is to provide a device which will add safety to systems utilizing flexible lines and thereby minimize loss of life and property by avoiding accidental over-fatigue and failure of such flexible lines.

A still further object of the present invention is to provide a measuring device wherein extended flexible line use may result with money savings which may result from reduction in the conventional safety factor presently prescribed by manufacturers. Conventional safety factors presently are high because of great inaccuracies which are inherent in the empirical method of estimating accumulated ton-miles.

A still further object of the present invention is to provide a measuring device which will point out to the user, in case of early line failure, that there may be excessive wear or misalignment of sheaves in the hoisting system in which the line is being used.

A still further object of the present invention is to provide a measuring device which will allow fatigue life evaluation of any flexible power transmitting device.

A still further object of the present invention is to provide a device which may be utilized in the evaluation of any apparatus whose life depends on load, speed, and acceleration.

In the drawings FIGURE 1 is a combined elevational, sectional schematic diagram of a hoisting system wherein the present invention may be incorporated;

FIGURE 2 is an enlarged, sectional, elevational view of the drum and measuring device shown in FIGURE 1;

FIGURE 3 is a perspective top view showing the housing for the control mechanism of the present invention, such control mechanism being an enlarged view in FIGURE 3 of the control mechanism shown in FIGURE 1.

Figure 4:
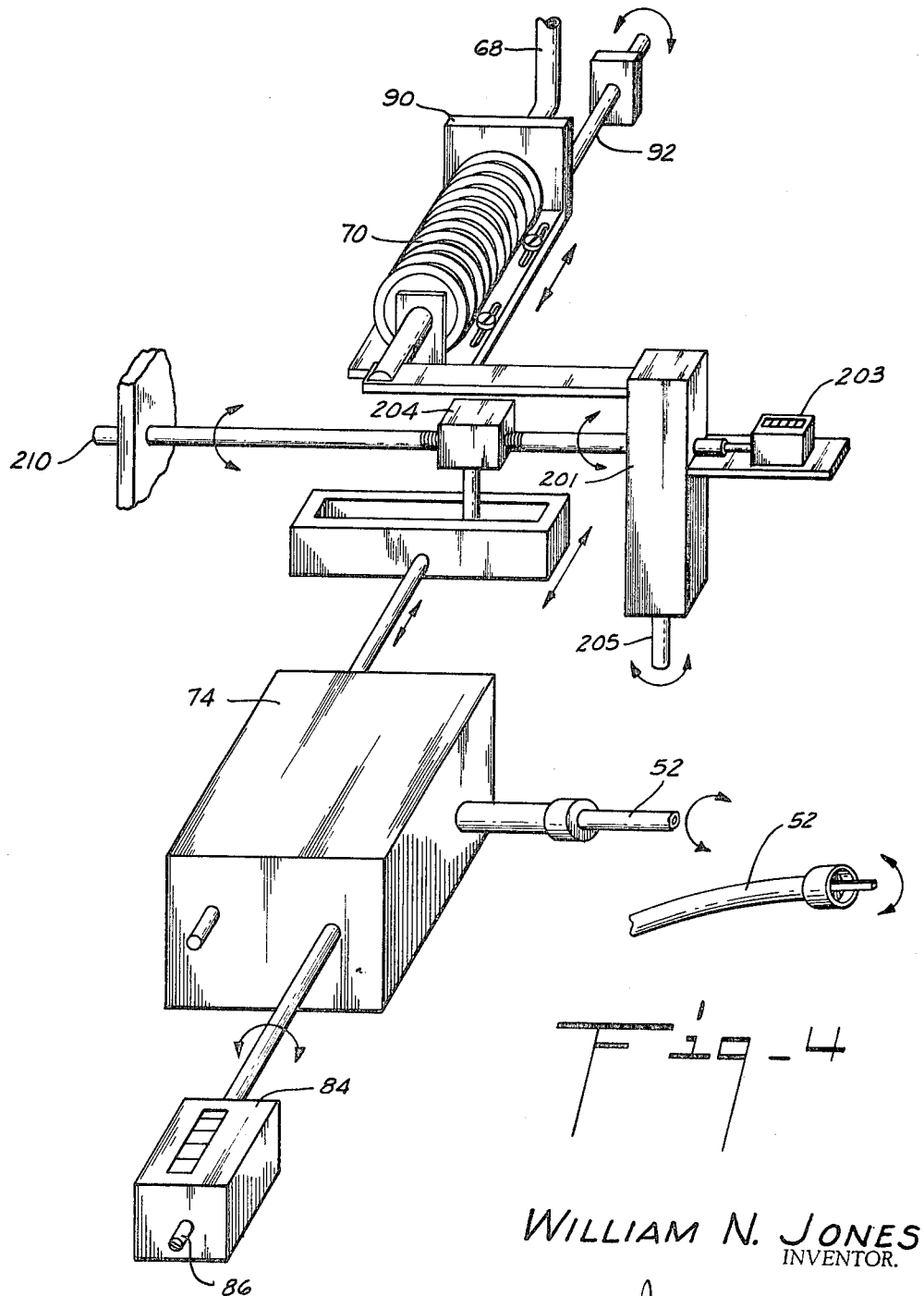
FIGURE 4 is a perspective view of an alternate means for providing adjustment in utilizing the present invention.

Briefly stated, the present invention provides a device which will continuously integrate and indicate on a digital counter the product of tensile load and distance traveled of any flexible line which operates a traveling block or similar mechanical-advantage apparatus. Industry practice has called for load and distance measurements in describing the fatigue life of a flexible line such as a wire rope. Since the device of the present invention multiplies the line load times the distance traveled by the flexible line, the device of the present invention may sometimes be referred to as ton-mile indicator.

Referring now to the drawings in detail, FIGURE 1 is a combined elevational, sectional schematic diagram of a hoisting system wherein the present invention is incorporated.

A powered drum 10 is shown positioned on an axle 12 which is supported by members 14 and 16 which may be positioned on the ground or on another suitable support member 18 in a manner well known in the hoisting art. Positioned on drum 10 is a flexible line such as wire rope 20. One end of the wire rope 20 may be coupled to a hydraulic load cell 22 which in turn is coupled to member 24 on a suitable support 26.

It will be apparent to those skilled in the hoisting art that the flexible line 20 is coupled in a well known manner to a group of crown sheaves 28, 30 and 32 positioned on member 34 which is coupled, for example, to a derrick (not shown). A traveling block 36 is suspended from the sheaves 28, 30 and 32 and such traveling block 36 includes members 38 and 40 coupled to support member 42 having a hook 44 positioned thereon for vertical movement. Rotation of the drum 10, therefore, causes vertical movement of the traveling block 36 to allow a weight such as pipe, for example, which may be coupled to hook 44, to be moved vertically.

Coupled to hydraulic load cell 22 is a line-load readout gage 46 well known in the hoisting art and in the well drilling art. Line-load readout gage 46 is coupled to line 48 which goes to the housing for control unit 50 of the present invention. Also coupled to control unit 50 is a flexible drive shaft 52 having one end coupled to either a friction drive motor 54 (option A) which is positioned for engagement with flange 56 of drum 10 or to the rotating shaft 12 (option B) shown by the broken line. The friction drive motor 54 may be fixedly positioned on a support 58 and coupled through a suitable member 60 to a member 62 which supports friction drive means such as a motor 54.

Control unit 50 includes a variable speed drive 64 coupled through coupling 66 to the flexible drive shaft 52. The variable speed drive 64 may be a Series 5, spring loaded type manufactured by Graham Transmissions, Inc., Menominee Falls, Wis., as shown on p. 11 of the Graham Technical Bulletin 7000 dated April 1963. Line 48 is coupled through member 68 to a pressure sensing bellows 70 which is coupled through member 72 to a ball and disk or other type of mechanical integrator 74. Bellows 70 may be of the type shown in Bulletin SF–767 of Robertshaw-Fulton Controls Company, Fulton Sylphon Division, Knoxville, Tenn. Integrator 74 may be of the type shown in the 1961 literature of General Precision, Inc., Librascope Division, Glendale, Calif., as Model Series 20–1. Flexible shaft 52 may be of the type and design shown in the supplement to bulletin 627 of Stow Manufacturing Company, Binghamton, N.Y. The ball and disk integrator 74 has a shaft 76 on which is coupled gear 78. Gear 78 engages gear 80 which is mounted on shaft 82 and coupled to a counter 84. Counter 84 may be of the type shown on pp. 7 and 8 of the June 1962 literature (Small Reset Counter Section A1a) of Veeder-Root Incorporated, Hartford, Conn. A counter reset 86 is coupled to counter 84. Shaft 88 is coupled to ball and disk integrator 74 and the function of shaft 88 and the counter reset will be explained subsequently.

A support 90 is utilized with bellows 70 and a zero adjust stand 92 is coupled to support 90 to allow adjustment of bellows 70.

The control unit 50 may be housed in suitable material such as steel or other durable panels. Control unit 50 may be positioned on a stand having variable height to allow counter 84 to be read by an operator without such operator having to bend over or get in an awkward position for reading the counter 84.

A dial 94 is provided on variable speed drive 64 and member 96 allows variable speed drive 64 to be adjusted as shown and explained in the literature previously mentioned.

It will be apparent from viewing FIGURE 1 that the adjustments to the control unit 50 may be made entirely along one side, namely, along side 98 so that the controls which are housed in control unit 50 may be easily and readily adjustable without the operator having to move to a plurality of inconvenient positions.

The components shown in FIGURE 1 have been identified and now the operation of the system shown in FIGURE 1 will be described in detail.

Two input signals are utilized in the system of the present invention and such signals are taken directly from the cable-operated hoisting mechanism. One input signal consists of a pressure signal taken from hydraulic load cell 22. Hydraulic load cell 22 may be of the conventional type manufactured and sold by Martin-Decker Corporation, Long Beach, Calif. Load cell 22 is coupled to the dead line of the cable 20 and is responsive to the load on hook 44. Readout gage 46 is coupled to load cell 22 and provides a reading directly in thousands of pounds. Load cell 22 exerts a maximum pressure of 100 p.s.i.g. thereby indicating full scale on readout gage 46. This particular pressure represents only a single system, but any other system can be used. The pressure signal generated by load cell 22 is a function of line load. The signal may or may not be linear but the signal always can be represented by a trigonometric function which can be made linear with simple geometric linkages. Thus, one input signal is provided through line 48 into control unit 50.

The other input signal of the system shown in FIGURE 1 is taken from drum flange 56 of drum 10 by friction drive motor 54 or directly from axle 12 as explained previously as option A or B. The friction drive motor 54 is simply a metering wheel which is spring loaded against the drum flange 56. Rotation of the drum 10 is transmitted to the friction drive motor 54 through an O-ring friction surface such as neoprene. The friction motor 54 contains a gear reduction to minimize wear in the mechanical integrator. For example, a 2.5 to 1 gear reduction may be used. The reduced rotational speed of the drum is transmitted to the control unit 50 through a standard flexible power drive 52.

Control unit 50 is utilized to transduce the two analog input signals, perform the required instantaneous multiplication, and convert the analog product to a digital readout which is indicated directly in ton-miles on the counter 84.

As mentioned previously, variable speed drive 64 may be a Graham Series 5a which delivers an output rotational speed linear with micrometer adjustment and which varies from 0 to 45% of input speed. The useful life of the variable speed drive 64 should be about 5 to 10 years depending, of course, on the amount of usage of the system of the present invention.

The ball and disk integrator 74 is used for multiplication of line translation and line load and, as mentioned previously, may be a Librascope Model 20–1. The ball and disk integrator is an extremely accurate device which was designed originally for fire control on large naval guns. The integrator will withstand heavy vibrational accelerations without damage to the mechanism. The anticipated life for the ball and disk integrator 74 is approximately 5 years. The particular ball and disk integrator presently being considered is designed to deliver a rotational output of 0 to 2.4 times input rotation. The change of ratio between the input shaft and the output shaft is accomplished by a translational motion of three-quarters of an inch of the ball carriage shaft. The translational motion is converted easily from a pressure signal with a common bellows. The bellows is required, in the particular system described, to have a maximum allowable pressure of 100 p.s.i.g. and must have a rate of three-quarter inch motion per 100 p.s.i.g. or .0075 inch per p.s.i. The bellows rate may be subject to wide variation because the device of the present invention may be calibrated after installation at a particular location.

The analog output of the ball and disk integrator 74 is converted to and indicated by the counter 84. The counter is unique in that it accumulates a positive count regardless of the rotational direction of the input shaft. Such a positive count is a requirement for the device of the present invention because, as shown in FIGURE 1, if the drum rotation is reversed, the final output shaft from the integrator will be reversed. The counter 84 accomplishes the positive accumulation through a cam action of the input shaft. The cam simply trips a lever on each rotation thereby adding one count to the dial. The lever is tripped regardless of the direction of cam rotation. The anticipated useful life of the counter 84 is approximately 5 to 10 years.

It will be appreciated that in any system utilizing a hoist mechanism, the drum 10 may be oscillated through a short distance so that the counter 84 is not actuated. The present invention minimizes the error induced by dead-spot oscillation by incorporating an extremely high resolution of ton-miles readout. For instance, at the maximum line load, 500 counts are made for each 100 feet of hook travel. At an average load of 150,000 pounds, 142 counts are recorded on the counter with each 100 feet of hook travel. Thus, the maximum dead-spot on the counter is equivalent to approximately 8 inches of travel by hook 44. In the drilling of oil and gas wells, for example, hook oscillations of this low amplitude would not occur normally.

Thus, it will be appreciated that the system shown in FIGURE 1 provides an accurate reading on counter 84 of the ton-mile movement of cable 20.

FIGURE 2 is an enlarged, elevational, sectional view of the friction drive motor 54 coupled to flange 56 as shown in FIGURE 1. Cable 20 is shown positioned on drum 10 having a flange 56. Friction drive motor 54 is coupled to support 58 by bracket 60 having set screws 100 and 102 for adjustment as will be explained subsequently. Arm 62 has a shock mount 104 and a mechanical stop 106. A pivot pin 108 is coupled to vertical arm 110. Metering wheel 112 has an O-ring 114 positioned thereon for contact at 116 with drum flange 56. As rotational movement of drum flange 56 occurs, it will be apparent that metering wheel 112 rotates shaft 118 which is in frictional engagement with another O-ring 120 positioned on member 122. Rotational movement of member 122 is transmitted through flexible shaft 52. As explained previously, flexible shaft 52 is coupled to the control unit 50.

FIGURE 3 is a perspective top view showing control unit 50 having sides 98 and 124 and sides 126 and 128 coupled as shown in FIGURE 3 to form a box with a bottom 130 coupled to such sides. As explained previously, flexible drive shaft 52 is coupled to shaft 66 of variable speed drive 64 having a dial 94. A ball and disk integrator 74 is shown having gear 78 coupled thereto and engaged with gear 80 of counter 84. An adjustment tool 132 is shown in FIGURE 3 and will be explained subsequently.

Hydraulic hose 48 is shown in FIGURE 3 adapted to be coupled to line 68. Line 68 is coupled to bellows 70 which is coupled to the ball and disk integrator 74 through shaft 72. Support 90 is shown coupled to adjustment shaft 92 having end 134 adapted to be turned with a suitable tool such as a screw driver to provide adjustment of the bellows 70 as will be explained subsequently. Also shaft 96 of the variable speed drive 64 has a notched end 136 which will accommodate a suitable tool such as a screw driver for adjustment, as will be explained, and ball and disk integrator 74 has a shaft 88 having a notched end 138 also for adjustment. Shaft 86 of the counter 84 also has a notched end 140 to allow zero adjustment of the counter 84.

The installation and calibration of the device of the present invention now will be explained. The control unit 50 may be positioned adjacent to the draw works on the drilling rig floor if the device of the present invention is to be utilized with a conventional drilling rig. The control unit 50 also can be coupled to an existing structure with a bracket, or as explained previously, a floor stand may be provided on which the control unit 50 may be positioned.

The hydraulic load cell is installed next on the deadline or the load cell 22 may be tied into an existing system with hydraulic hose. The friction drive motor 54 may be installed next with bracket 60 coupled to support 58. The tension of the friction drive wheel 112 can be set properly by mounting the vertical arm 110 parallel to the mechanical stop 106 located on supporting arm 62. Set screws 100 and 102 may be loosened and the arm 62 moved until the proper setting is attained. Set screws 102 and 100 then are tightened.

In calibrating the device of the present invention, the adjustment slot 136 of shaft 96, which is coupled to variable speed drive 64, is turned until dial 94 located on the top of variable speed drive 64 indicates 100%. A zero adjustment of the pressure bellows 70 is accomplished through rotation of threaded shaft 92 at slot 134 when the traveling blocks are on the drilling rig floor or by hanging the traveling blocks in the derrick to relieve all load on the line. The tool 132 is inserted in the input shaft 66 and the input shaft 66 is rotated with tool 132. End 138 of ball and disk integrator 74 of shaft 88 should be observed and zero adjustment screw 134 should be adjusted until the integrator shaft 138 ceases to rotate. This operation insures that at no load conditions no counts will result from movement of the line 20. The rotation of the tool 132 may now stop and the tool may be withdrawn since the adjustment has been completed. Next, flexible drive shaft 52 is coupled to shaft 66. The counter 84 may be set to zero by using a standard screw driver in slot 140 on shaft 86.

A measuring tape may be coupled to the elevators of the drilling rig and as the elevators are raised at a slow, steady rate for approximately 100 feet, the load indicated on the weight indicator should be observed. The following equation may be utilized:

$$\text{Ton-miles} = \frac{\text{Hook load (pounds)} \times \text{distance the traveling block was raised (feet)}}{2,000 \text{ tons per mile} \times 5,280 \text{ feet per mile}}$$

As an example, if the average hook load is 105,600 pounds and the distance picked up is 100 feet, the ton-miles would be calculated as 105,600 times 100 divided by 2,000 times 5,280 for one ton-mile. Since the counter of the present invention measures to 1/100 of a ton-mile the number on counter 84 should be one hundred.

With a variable speed drive 64 or other span control element in the pressure input device set at 100%, the number on the counter 84 should indicate more counts than the actual ton-miles. For instance, if the counter indicated 214 counts or 2.14 ton-miles the span control must be reset so it will indicate only 100 over 214 as much in order to read correctly. In order to correct the counter so it will read directly in ton-miles, the variable speed drive 64 is adjusted until the dial 94 reads the proper percent of full scale. The percent setting of the variable speed drive 64 is determined by dividing the calculated ton-miles by the number accumulated on the counter 84. The scale setting of scale 94 is equal to 100 divided by 214 or .4673 which is 46.7 percent. Adjustment screw 136 therefore is rotated until dial 94 reads 46.7. The counter 84 then is reset to zero and thereafter the device of the present invention will read directly on the counter dial of counter 84 the actual accumulated ton-miles of the line.

The span adjustment can be made also by applying a multiplying factor to the pressure input with applicable linkage. This would eliminate the need for a variable speed transmission such as the Graham Series 5a. The span adjustment located in the pressure input to the integrator could have a counter incorporated to indicate a relative value of 100% input and this could be treated exactly as the adjustment of the variable speed drive mentioned above. FIGURE 4 is a perspective view of an alternate means for providing such span adjustment. The variable span linkage in the pressure input could be accomplished by adjusting the length of a lever 201 connecting the pressure bellows 70 to the integrator 74. The adjustment of the lever length could be made by a screw 210 to which a counter 203 is attached. The number of threads on the adjustment screw 210 dictates the position of the pivot 204 on the lever 201 with the span adjustment counter 203 set at 100 counts which represents the length of 100 threads from the center of rotation 205 of the lever 201. For example, a ¼″–28 adjustment screw would dictate that the pivot 204 be located 100/28 inches from the center of rotation 205. Thus, a span adjustment could be imparted to the integrator 74 by the same technique used with the variable speed transmission. By simply turning the adjustment screw 210 until the attached counter 203 indicated the proper reduction of the ratio of the initial pressure input to the desired pressure input to accomplish a ton-mile counter 84 output which directly represents the true ton-miles accumulated on the wire rope 20. Thus, FIGURE 4 shows how the variable speed drive 64 may be eliminated while still retaining a span adjustment to provide a direct ton-mile readout. The mechanism shown in FIGURE 4 will allow an approximate savings of 40% in component parts over the parts shown in connection with the description for FIGURE 1. Since the mechanical integrator multiplies two input functions, a variable ratio of integrator input to integrator output can be obtained by applying a multiplying factor to either of the two input functions, namely, pressure or input rotation.

Thus, the present invention provides a device which will accurately read ton-miles or other suitable units for aid in determining the fatigue factor of a flexible line such as a wire rope. The device of the present invention will accumulate as much as 1,000 ton-miles and is capable of reading to the nearest .01 ton-mile. When the flexible line or wire rope is slipped or replaced, the device of the present invention is merely reset to zero at the counter and no further adjustment is required. Recalibration of the device of the present invention is necessary only when the weight indicator on the dead-line is recalibrated. The accuracy of the device of the present invention can be checked at any time by picking up drill string for a known distance and multiplying the load times the distance traveled. By observing the increase in the dial counts, a comparison can be made to see if the dial count agrees with the reading obtained by multiplying the load times the distance traveled. The over-all error of the device of the present invention is about one-quarter percent of the counter reading.

I claim:
1. A device for recording movement of a flexible line having a weight coupled thereto, said device including in combination weight sensing means coupled to the flexible line for providing a signal indicative of the weight on said line, displacement sensing means coupled to the flexible line for providing a signal indicative of distance traveled by the weight on said line; and recorder means including a variable speed drive, a mechancal integrator coupled to said variable speed drive, a pressure sensor coupled to said mechanical integrator, and a counter coupled to said mechanical integrator for recording the summation of the product of weight on said line times distance traveled by the weight.

2. A device for recording movement of a flexible line having a weight coupled thereto, said device including in combination weight sensing means coupled to the flexible line for providing a signal indicative of the weight on said line, said weight sensing means includng a hydraulic load cell and a line load read-out gage coupled to said hydraulic load cell, displacement sensing means coupled to the flexible line for providing a signal indicative of distance traveled by the weight on said line, said displacement sensing means including drive means and a flexible drive shaft coupled to said drive means, and recorder means including a variable speed drive coupled to said flexible drive shaft, a mechanical integrator coupled to said variable speed drive, a pressure sensor coupled to said mechanical integrator and to said hydraulic load cell, and a counter coupled to said mechanical integrator for recording the summation of the product of weight on said line times distance traveled by the weight.

References Cited
UNITED STATES PATENTS

| | | | |
|---|---|---|---|
| 1,417,461 | 5/1922 | Eason | 73—141 |
| 2,528,883 | 11/1950 | Hayward | 73—144 XR |
| 2,765,653 | 10/1956 | Botsch | 73—141 |
| 3,298,226 | 1/1967 | Hildebrandt | 73—133 XR |

RICHARD C. QUEISSER, *Primary Examiner.*

C. A. RUEHL, *Assistant Examiner.*